Nov. 4, 1941.  O. STEINER  2,261,421
UNITARILY CONNECTED CAMERA RANGE FINDER AND COUPLING MECHANISM THEREFOR
Filed Dec. 29, 1939  6 Sheets-Sheet 1

Inventor:
Oscar Steiner,
by Emery, Booth, Townsend, Miller and Landon
Attys

Nov. 4, 1941.    O. STEINER    2,261,421
UNITARILY CONNECTED CAMERA RANGE FINDER AND COUPLING MECHANISM THEREFOR
Filed Dec. 29, 1939    6 Sheets-Sheet 2
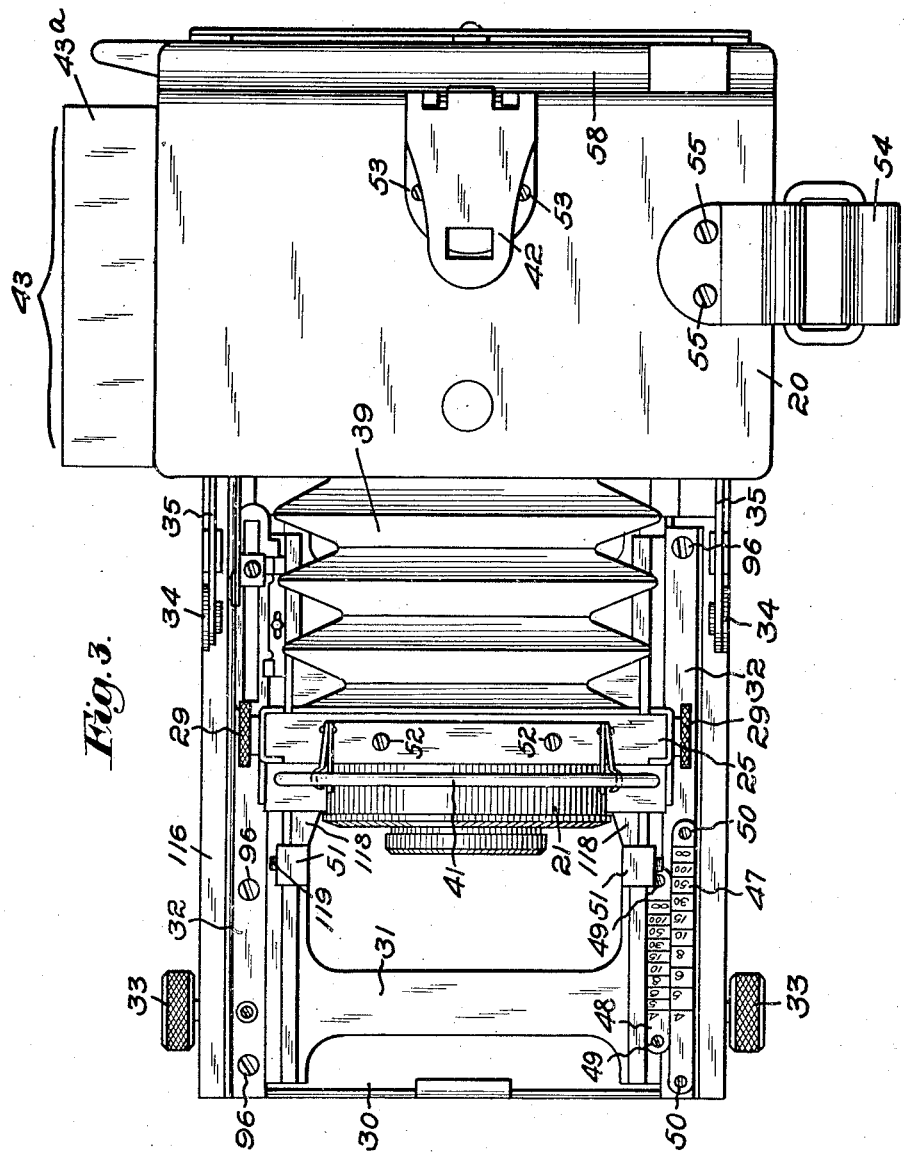
Inventor:
Oscar Steiner, Nov. 4, 1941.                O. STEINER                2,261,421
UNITARILY CONNECTED CAMERA RANGE FINDER AND COUPLING MECHANISM THEREFOR
                  Filed Dec. 29, 1939        6 Sheets-Sheet 3
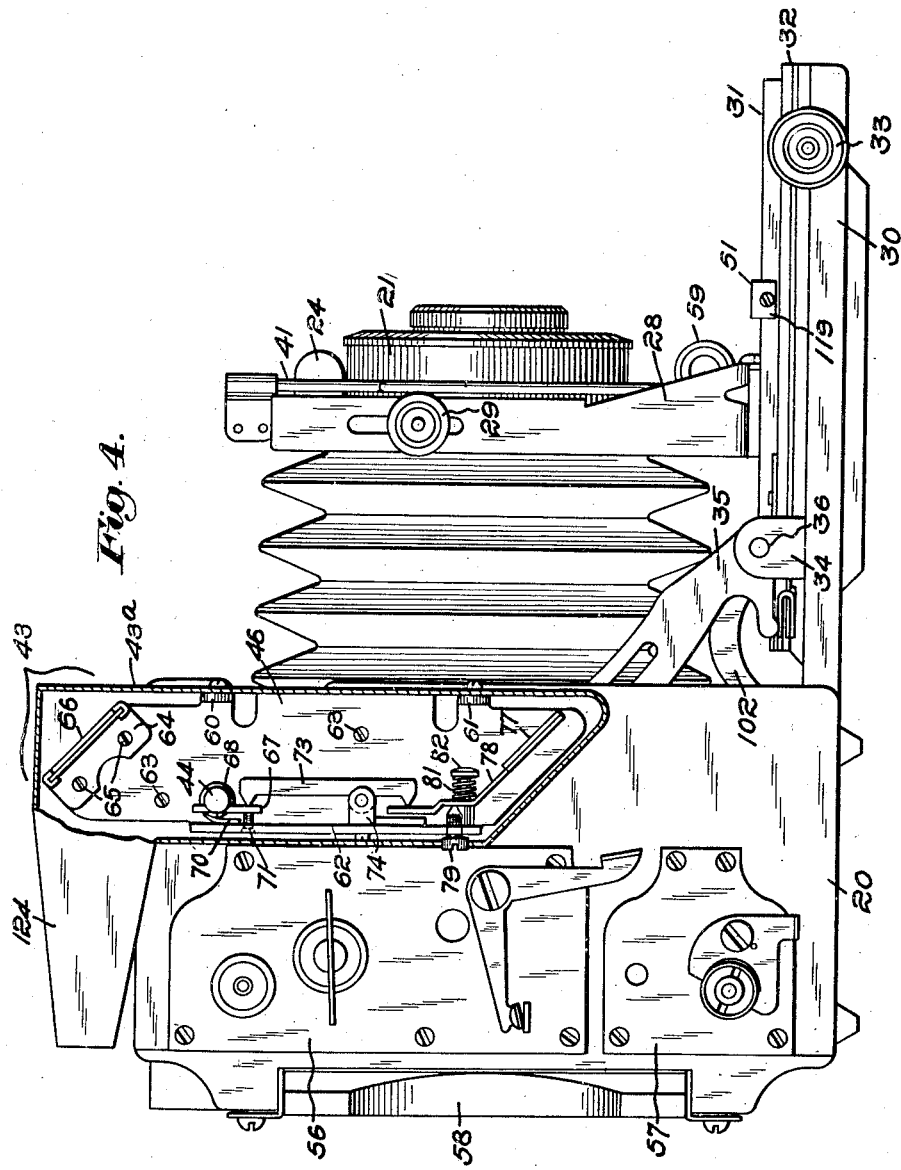
Inventor:
Oscar Steiner,
by Emery, Booth, Townsend, Miller and Vivider
                                        Attys Nov. 4, 1941. O. STEINER 2,261,421
UNITARILY CONNECTED CAMERA RANGE FINDER AND COUPLING MECHANISM THEREFOR
Filed Dec. 29, 1939 6 Sheets-Sheet 4
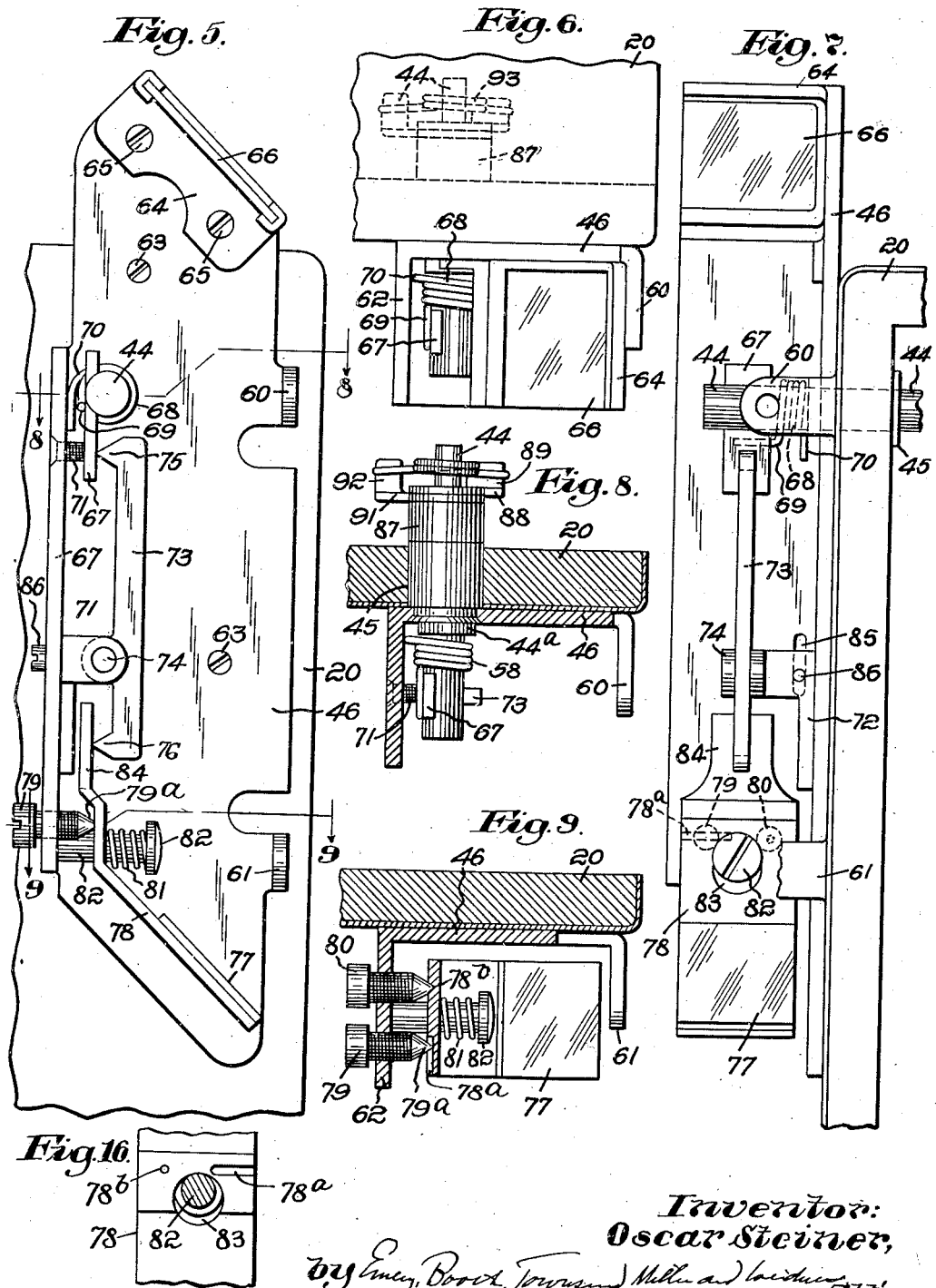
Inventor:
Oscar Steiner,

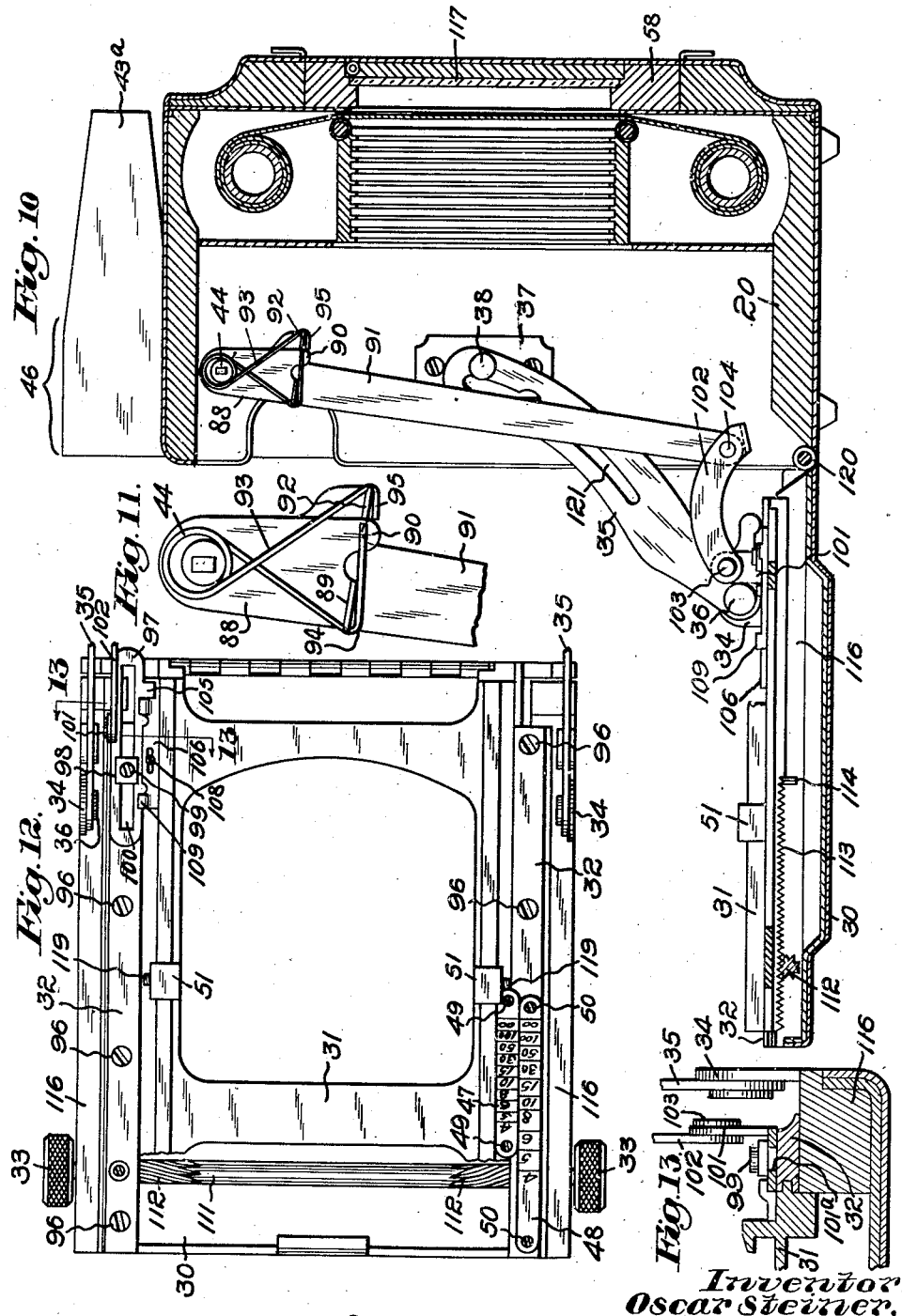

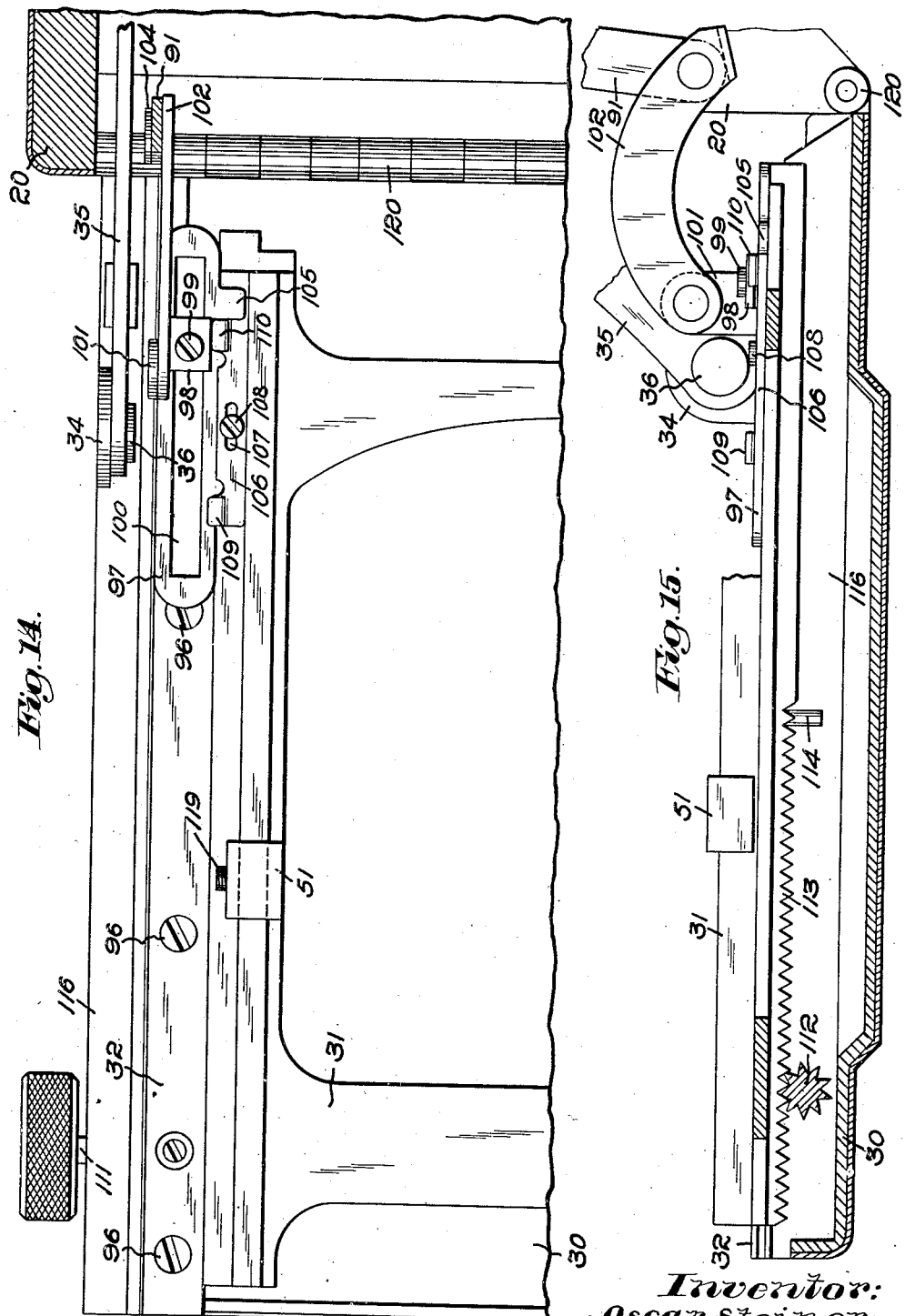

Patented Nov. 4, 1941

2,261,421

UNITED STATES PATENT OFFICE 2,261,421

UNITARILY CONNECTED CAMERA RANGE FINDER AND COUPLING MECHANISM THEREFOR

Oscar Steiner, Irondequoit, N. Y., assignor to The Folmer Graflex Corporation, Rochester, N. Y., a corporation of Delaware Application December 29, 1939, Serial No. 311,568

19 Claims. (Cl. 95—44)

This invention relates to an improved unitarily connected camera range finder and coupling mechanism therefor.

In order that the principle of the invention may be readily understood, I have disclosed a single embodiment thereof in the accompanying drawings, wherein—

Fig. 3 is a top plan view of the camera having the range finder attached thereto, the camera front door being open to form a bed for the camera focusing mechanism;

Fig. 4 is a side elevation of the camera with the camera door open, the camera front being extended and part of the range finder cover being cut away to show the construction of the range finder;

Fig. 5 is a side elevation of the range finder mechanism with its cover removed;

Fig. 6 is a fragmentary top plan view with certain parts dotted in, so as to show the relationship of the mirror operating shaft and its coupling mechanism;

Fig. 7 is a front elevation of the range finder with its cover removed;

Fig. 8 is a transverse section taken through Fig. 5 on the line 8—8 thereof;

Fig. 9 is a transverse section taken through Fig. 5 on the line 9—9 thereof, showing the mirror adjusting means;

Fig. 10 is a vertical section taken through the camera, more clearly to show the range finder operating connecting means;

Fig. 11 is an enlarged fragmentary detail in elevation of a part of Fig. 10;

Fig. 12 is a plan view of the camera door or bed, showing the connection of the range finder operating means to the camera track;

Fig. 13 is a detail in vertical section taken through Fig. 12 on the line 13—13 thereof;

Fig. 14 is a plan view upon an enlarged scale of part of the construction shown in Fig. 12;

Fig. 15 is a longitudinal section of Fig. 14, to show the relationship of some of the operating parts; and Fig. 16 is a detail partly in section, of the upper end of the mirror-supporting plate.

This range finder is shown as applied to a Speed Graphic camera, but it is to be understood that it can be applied to any camera of that general type. One of the objects of the invention is to provide a range finder that is readily attachable to existing cameras. Other objects are to provide a range finder with a coupling mechanism that will accurately track with the movement of the camera objective lens during focusing of the camera, which range finder can be quickly and accurately adjusted and aligned, and which in no way interferes with the normal use of the camera either when the door is open or when closed, and permits adjusting the tracking of the range finder to the tracking of the objective lens of the camera, so as to take care of camera objectives of widely varied focal lengths, the range finder being very rigid in structure and having its parts of such simple construction that it can be manufactured at a low cost.

Figure 1:
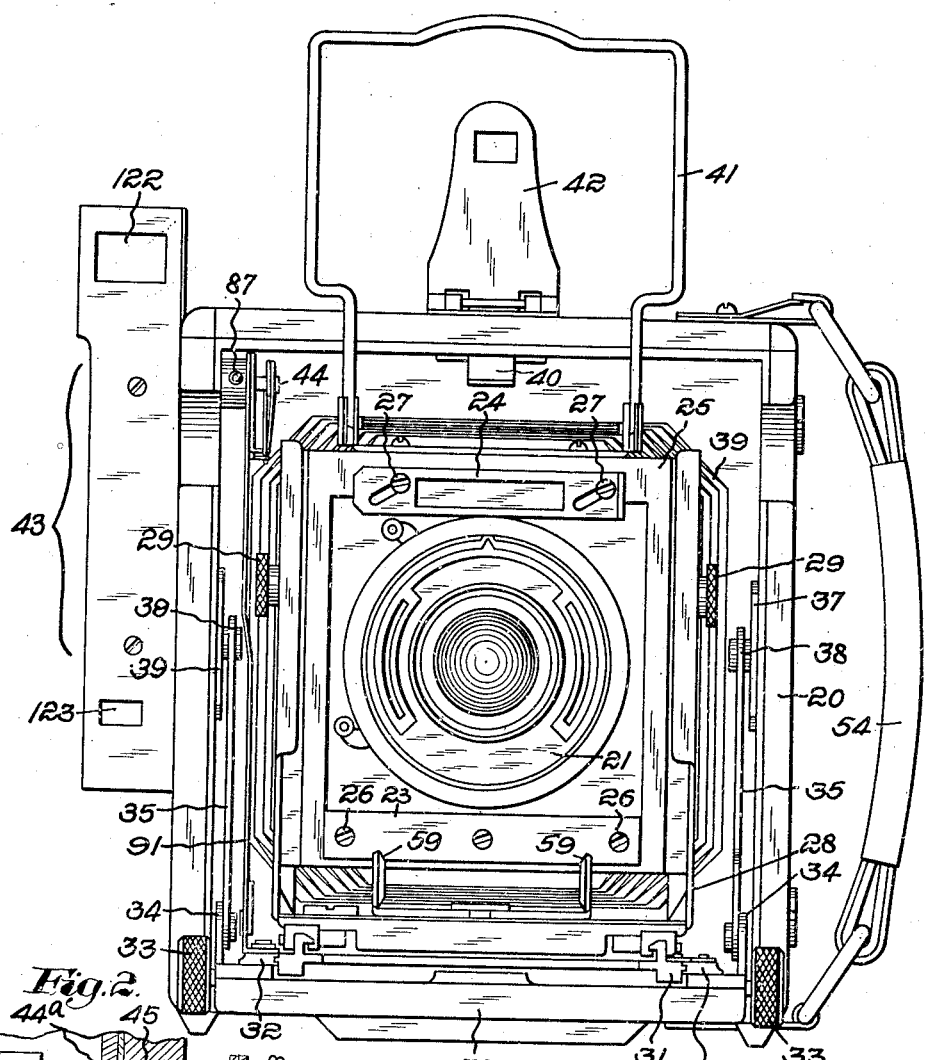
Fig. 1 is a front elevation of the camera with the door open, the bellows extended, and the wire view finder in position for use, the camera having attached thereto a range finder and coupling means to constitute a unitary structure.

Referring first to Figs. 1, 3 and 4, disclosing the general structure of the camera and which, except as herein claimed, may be of any suitable structure, but desirably is of the Speed Graphic type, the camera box or casing is indicated generally at 20, the objective lens and shutter at 21, the lens-board at 22, the lower stationary lens-board retaining strip at 23 and the sliding lock for the lens-board at 24. The combined camera front member and bellows frame is indicated at 25 and the said lens-board retaining strip 23 is attached to the said frame 25 by means of screws 26, 26, the sliding lock 24 being held to the said frame 25 by means of screws 27, 27. The said frame 25 is held to the camera yoke 28, best shown in Fig. 4, by clamp screws 29, 29. The camera bed is designated generally at 30 and the camera track at 31, which is constructed to ride back and forth in guide rails 32, 32. The said track 31 is moved backward and forward by means of focusing knobs 33, 33.

The said camera bed 30 is provided with upturned ears 34, 34, to which are attached side-arms 35, 35 by means of shoulder rivets 36, 36. The side walls of the camera are provided with side-arm plates 37, 37, each having a stud 38. The means for connecting the said side-arms to the studs 38 will be set forth at a subsequent part of the specification. The camera is provided with the usual bellows 39 and door latch 40, and also with a wire range finder made up as a wire rectangle 41 and a peep-sight.

Although I have described in detail the general structure of the camera, it is to be understood that the range finder now to be described may be structurally connected with other types of cameras than that which has just been described, as, for example, a camera having a two-part track such as is shown in my co-pending application Ser. No. 309,385, filed December 15, 1939.

Figure 2:
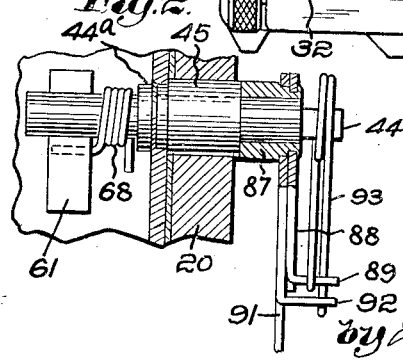
Fig. 2 is a detail in vertical section through the range finder operating shaft that passes through one of the camera walls.

Attached to a side wall of the camera frame is a range finder generally designated as 43 and having a removable cover 43a. The said range finder 43 has a shaft 44, most clearly shown in Fig. 2, which passes through a bushing 45 attached to the range finder bed plate indicated at 46. The said bushing 45 passes through the wall of the camera box 20, as shown in Fig. 2. A more detailed description of this structure will be given at a subsequent part of the specification.

In Fig. 3, the camera front member and bellows frame 25 has been moved out on the track 31 to the position it would occupy if the camera were focused on an object at a four foot distance. This position can be ascertained by reference to focusing scales 47 and 48, the latter being attached to the camera track 31 by means of screws 49, 49, and the former being attached to the camera bed 30 by means of screws 50, 50. The said camera track 31 is provided with infinity stops 51, 51, to locate the position of the frame 25 on the camera track 31. Said Fig. 3 clearly shows that the wire frame finder 41 is attached to the combined front member and bellows frame 25 by means of screws 52, 52. The camera peep-sight 42 is attached to the camera box or casing by means of screws 53, 53. The camera is also provided with usual handle 54 fastened thereto by screws 55, 55 only the upper ones of which are shown.

Referring now more particularly to Fig. 4, the position of the parts is shown in side elevation as they appear when the frame 25 is moved partly out on the track 31, but has not yet reached the infinity stops 51, 51, the range finder itself being shown partly in vertical section. In said Fig. 4, there is also shown generally the focal plane shutter mechanism, made up of shutter plate 56 and tensioning plate 57. This structure is so well known as not to require further description. The camera is also provided with the usual spring-back 58. The camera yoke 28, previously referred to, is provided with the usual clamping means having handles 59, 59.

I will next describe the structure of the range finder wherefrom the cover 43a has been removed, and I will for that purpose particularly refer to Figs. 4 and 7. There is shown a bed plate 46 having two spaced, upturned ears 60, 61, the rearmost part of the bed plate 46 being bent up to form a back plate 62. The said bed plate 46 is attached to the camera box or casing 20 by means of screws 63, 63. The said bed plate 46, together with the back plate 62 which is integral therewith, may be, by manipulation of said screws 63, 63, removed from or secured to the casing of the camera without necessarily disturbing any of the herein described adjustments that pertain to the range finder. On the uppermost end of the said bed plate 46 is attached a mirror frame 64 by means of screws 65, 65, the said mirror frame 64 supporting a semitransparent mirror 66. The shaft 44 previously referred to and shown enlarged in Fig. 2, passes through the said plate 46 and has attached on one end an operating plate 67, best shown in Figs. 2 and 4. Around the said shaft 44 is placed a coiled spring 68 having one end thereof upturned and bearing against the operating plate 67. The other end 70 of coiled spring 68 is so formed that it rests against the back plate 62, as shown in Fig. 6, thus tending to cause said shaft 44 to be turned in a contra-clockwise direction. The said operating plate 67 is stopped in its movement in a clockwise direction by a so-called infinity adjusting screw 71. To the said back plate 62 is attached a bearing member or bracket 72 to which is attached a rocker arm or lever 73 by means of a shoulder rivet 74. The bearing member or bracket 72 is so constructed that it can be adjustingly moved upward or downward and locked in any desired position, by means subsequently to be described.

The rocker arm or lever 73 is provided with points 75, 76, best shown in Figs. 4 and 5. The lower end of the range finder structure is provided with a first-surface mirror 77 that is cemented to a mirror-supporting plate 78 pivoted on two cone-point screws 79, 80 (Fig. 9), and is held thereon by a coiled spring 81 encircling a shoulder rivet 82.

The shoulder rivet or screw 82 passes through a hole 83 in the mirror-supporting plate 78 and is threaded into the back plate 62. Said mirror-supporting plate 78 is provided with a groove 78a, which is V shape in cross section, and with a countersink 78b, shown in Figs. 7, 9 and 16. The mirror-supporting plate 78 is pivoted on the cone-pointed screw 80 at the countersink 78b and on the cone-pointed screw 79 in the V groove 78a. The cone-pointed screw 79 is so constructed that the center of the cone point thereof is not in alignment with the center or axis of screw 79. This is done in order to provide for a setting-adjustment of the mirror-supporting plate 78 for properly locating the position of the first-surface mirror 77 in relation to the semitransparent mirror 66 during the process of manufacture. It will be understood that when the range finder is in the infinity position, the mirror 77 will be parallel with mirror 66 on both its vertical and horizontal axes. It is difficult to hold manufacturing accuracy to such limits that no adjustments are necessary. Therefore, I have provided the means just described for properly aligning mirror 77 with the mirror 66. The turning of the screw 80 to right or to left will cause the mirror-supporting plate 78 to pivot on the screw 79, thus providing means for adjusting mirror 77 in a horizontal direction. The turning of the screw 79, which has its cone-point riding in the groove 78a, will cause the mirror-supporting plate 78 to pivot about the screw 80, thus providing adjustment in a vertical plane. After mirror 77 has been accurately aligned with mirror 66, the screws 79 and 80 are then locked in place and no further adjustment is necessary. Any well known means may be employed for locking screws 79, 80, but I prefer to use a cement such as Glyptol.

After screws 79 and 80 have once been adjusted and locked in place, the mirror-supporting plate 78 will then pivot in action on screws 79 and 80, and said mirror 77 will always be caused to travel in alignment with the mirror 66, so that an image reflected from the mirror 77 will coincide with the image reflected from mirror 66 when the range finder is adjusted for any particular distance. This is very important in practice, because if there were a slight misalignment of mirror 77 with respect to the mirror 66, the two images could not be made exactly to overlie each other or coincide, and it would be difficult to tell whether the range finder, when used for focusing, was in proper adjustment corresponding to a given distance.

The upper end of the mirror-supporting plate 78 is provided with a flat surface 84, best shown in Fig. 7, which is engaged by the point 76 of the rocker arm or lever 73. If the shaft 44 is rotated in a contraclockwise direction viewing Fig. 5, the operating plate 67, which is attached to shaft 44, will also turn in a contraclockwise direction. The point 75 of rocker arm 73 will be caused to move outward about the pivot 74 of the bracket 72, that is, to the right viewing Fig. 5. The point 76 of the rocker arm 73 will be caused to move inward against the flat surface 84 of the mirror-supporting plate 78, thus causing the said plate 78 to be rocked on the cone-point screws 79, 80 as pivots, against the tension of the coiled spring 81.

When the shaft 44 (the means for connecting which to the movable camera front frame 25 will be subsequently described) turns in a clockwise direction, turning with it the operating plate 67, the rocker arm 73 will follow said operating plate 67, due to the fact that the spring 81 pushes downward on the mirror-supporting plate 78 and because the flat surface 84 of said plate pushes outward on the point 76 of the rocker arm or lever 73.

In order to provide means for changing the ratio of movement between the operating plate 67 and the mirror-supporting plate 78, the bracket or bearing member 72 is made adjustable with respect to the bed plate 46. The said back plate 62 is provided with a slot 85, best shown in Fig. 7, through which passes a screw 86 which is threaded into the said bracket 72. By loosening the screw 86 the said bracket 72 can be moved upward or downward in the slot 85, thus changing the position of the points 75 and 76 on the operating plate 67 and the flat surface 84 respectively. When the bracket 72 is in the all-the-way-up position, the radius from the center of shaft 44 to the contacting point 75 will be shorter than when the bracket 72 is in the all-the-way-down position or in any intermediate position. Therefore, when the bracket 72 is in the all-the-way-up position, less motion will be transmitted to the rocker arm 73 than when said bracket 72 is in the all-the-way-down position. Also, when the said bracket 72 is in the all-the-way-down position, the radius from the pivot point at the said screws 79, 80 to the position where the point 76 of the rocker arm 73 contacts with the flat surface 84, is much shorter than the radius is between these points when bracket 72 is in the all-the-way-up position. Thus, there is provided an adjustment to take care of a wide range of objective lenses with respect to their focal lengths, and at the same time the range finder herein disclosed is caused to track with any of such various lenses.

The shaft 44 passes through the bushing 45, as best shown in Figs. 2 and 8, and has attached to its outermost end a hub 87 to which is fastened a radially extending arm 88, shown on an enlarged scale in Fig. 11. The arm 88 is provided with an out-turned end 89, shown in Figs. 2 and 8, and with an extending arm 90, shown in Fig. 11. Riding on an extension of hub 87 and held in place by the arm 88, as shown in Fig. 8, is a second arm 91 having an out-turned end 92, most clearly indicated in Figs. 2, 8 and 11.

Referring particularly to Figs. 2, 6, 8, 10 and 11, there is placed about the shaft 44 a coiled spring 93 having a hooked end 94 which rides over the upturned end 89, and having a second hooked end 95, shown in Fig. 11, which rides over the upturned end 92, thus tending to hold the said finger 90 of the range finder arm 88 in contact with the said upturned end 92 of the range finder arm 91. The purpose of this construction is to permit the said range finder arm 91 to continue to move even though the motion of the said arm 88 has been stopped because of the fact that the operating plate 67, attached to the shaft 44, has contacted with the infinity adjusting or stop screw 71. As the range finder is adjusted, the said infinity adjusting or stop screw 71 limits the motion of the said shaft 44, thus also limiting the motion of the mirror-supporting plate 78 to a position wherein the mirrors 66 and 77 are parallel with each other, this being the infinity position.

Since the camera track 31 moves back beyond the infinity position when closing the camera, the said range finder arm 91 will be caused to be thrust further back in a rearward direction than the infinity position indicated in Fig. 5. It is for such reason that, in the disclosed embodiment of the invention, means must be provided to allow the range finder arm 91 to travel further than the travel of the said arm 88.

Referring to Figs. 10, 13, 14 and 15, the camera track 31 is provided with guide rails 32, one only of which is shown in Figs. 14 and 15, and which guide rails are fastened to the camera bed 30 by means of screws 96. On the one guide rail 32, shown in Figs. 14 and 15, there is mounted a slidable strip-like member 97, by means of a block 98 held to the said rail 32 by a screw 99. The said slidable member 97 is provided with a lengthwise extending slot 100, and since the block 98 is provided with a step-like formation, best shown in Fig. 13 at 100a, the said strip-like member 97 is free to slide on the said block 98. The said strip-like member 97 has an upturned lip 101, best shown in Figs. 14 and 15, to which is pivotally attached an arcuate link 102 by means of a shoulder rivet 103, best shown in Figs. 10 and 15. The said link 102 is fastened at its other end to the range finder arm 91 by means of a shoulder rivet 104, best indicated in Figs. 10 and 15. Thus, any motion of the range finder arm 91 will be transmitted through the arcuate link 102 to the said slidable strip-like member 97.

Inasmuch as the coiled spring 68, previously described as surrounding the shaft 44, as best shown in Fig. 8, tends to cause the said shaft 44 to turn in a contraclockwise direction viewing Fig. 5, the arm 88, described as attached to the said shaft 44, will also move with said shaft 44 in a clockwise direction viewing Fig. 10. The spring 93 coiled about said shaft 44 will cause the range finder arm 91 also to be moved in a clockwise direction, as previously described, moving with it the said link 102 and the slidable member 97. The latter is provided with a laterally extending finger 105, best shown in Fig. 14, and the camera track 31 is provided with an adjustable stop member 106, there shown. The said stop member 106 is provided with a short lengthwise extending slot 107 and is held to the said camera track 31 by means of a screw 108 extending through the slot 107 and threaded into the said track 31. Inasmuch as the said stop member 106 is provided with the slot 107, an adjustment can be made as to the position of the said stop member 106 with respect to the camera track 31. The said stop member 106 is also provided with two upstanding bosses 109, 110 which constitute guides for the said slidable member 97. The said boss 110 also serves as a stop for the finger 105 of the slidable member 97, thus limiting the motion of the said slidable member 97, which in turn limits the movement of the range finder arm 91 through the link 102 attached thereto as shown in Figs. 10 and 15.

The focusing knobs 33, 33 are fast on a shaft 111, best shown in Fig. 12. The said shaft is provided on each end with spiral gear teeth 112, 112, meshing with respective racks 113, 113, on the camera track 31, one only of said racks being shown in Figs. 14 and 15. When said knobs 33, 33 are turned, the gear teeth 112 meshing with racks 113 cause the camera track 31 to be moved forward or backward depending upon the direction in which the knobs 33, 33 are turned. The said camera track 31 is provided also with a stop pin 114, shown in Figs. 10 and 15, as provided for the purpose of limiting the motion of camera track 31 in a forward direction, when the said stop pin 114 contacts with the gear 112 on the gear shaft 111.

In Figs. 10, 12, 14 and 15, the camera track 31 is shown in the all-the-way-back position. This is the infinity position of the camera track 31 and the infinity marking on the scales 47 and 48 is correctly shown in Fig. 12. If the camera front 25 and the yoke 26 thereof are pulled out on the camera track 31, the said camera front and yoke will be stopped against the infinity stops 51, 51. The latter are set in their correct position by trial; that is to say, the camera front and yoke are pulled out and adjusted back and forth with respect to the camera track 31 until the infinity position is registered on the ground glass, which is indicated at 117 in Fig. 10. This adjustment is made when the camera track 31 is in the all-the-way-back position. The said infinity stops 51, 51 are then positioned on the camera track 31 in contact with the camera bed shoes 118, 118, best shown in Fig. 3. The infinity stops 51, 51 are then locked in place by means of locking screws 119, 119, shown in Fig. 3.

The range finder linkage is now adjusted so that it too will be in the infinity position. The first-surface mirror 77 is set to the correct position for infinity by properly setting the infinity adjusting or stop screw 71, best represented in Fig. 5. The camera track 31 is in the all-the-way-back position and the focusing scales will be as shown in Fig. 12. The infinity stops 51, 51 will be adjusted as previously described. The strip-like member 97 will now be slid rearward until the infinity position of the range finder is found. The clamping screw 108 (Fig. 14) will now be loosened and the stop member 106 will be positioned so that the boss 110 will contact with the laterally extending finger 105 when the range finder is adjusted for infinity. The clamp screw 108 will then be tightened and the camera is ready for operation.

Any movement of the camera track 31 caused by turning the focusing knobs 33, 33 will cause a like movement of the stop member or plate 106, and as said member 106 is moved forward, the strip-like slidable member 97 will follow the movement of the said stop member 106, because the range finder arm 91 (Figs. 10 and 15) is caused to be thrust forward under the influence of spring 68 as described, and as the camera bed 31 is caused to be moved rearward, because of the turning of focusing knobs 33, 33, the said range finder arm 91 will also be caused to move rearward under the influence of the said boss 110 of the stop member 106 when it contacts with the laterally extending finger 105 of the said slidable member 97. The connecting link 102 and the range finder arm 91 will also be caused to be moved back. Thus the range finder is caused to track or follow with all motions of the camera track 31; that is, it is coordinated in action therewith. Since the infinity stops 51, 51 can be adjusted to any position along the camera track 31, lenses of varying focal length can be used.

The infinity stops 51, 51 are always placed in the correct position for a lens of a particular focal length, and the range finder can be adjusted to track with any particular lens by adjusting the bracket or bearing member 72 for the rocker arm 73, as fully described hereinbefore. The structure herein set forth interferes in no way with the usual operation of the camera because of the disclosed construction of the range finder linkage or coordinating mechanical connection.

The said camera bed 30 is hinged to the camera box or casing 20 by means of a so-called piano hinge 120, shown in Figs. 12, 14 and 15. In order to close the camera, the side arms 35 are pushed by the user of the camera toward the back thereof, disengaging notches in the side arms from studs or pins 38, thus allowing the camera to close on the said hinge 120. Each stud or pin 38 slides in a groove in a side arm 35, one such groove being shown at 121 in Fig. 10. The range finder arm 91 is pushed rearward as the camera bed or door 30 is closed, and inasmuch as the range finder arm 88 can only travel a given distance in a contraclockwise direction, due to the stop in the range finder, as previously described, the additional or lost-motion travel of the range finder arm 91 takes place through the tensioning of the coiled spring 93, as previously described. When the camera bed or door 30 is opened, the said range finder arm 91 is thrust forward under the influence of the said coiled spring 93, to the position shown in Fig. 10.

As shown in Fig. 1, the cover 43a of the range finder is provided with a window 122, that is placed before the semitransparent mirror 66, and with a second window 123 that is placed before the first-surface mirror 77. The said cover 43a prevents any light from entering the range finder excepting through the said windows 122, 123. The said cover 43a has a rearwardly extending member 124, shown in Fig. 4, having a hole (not shown) for sighting through the range finder.

It has been stated that the cone-pointed screw 79 has its point 79a non-concentric with the body or axis of the screw. This permits an adjustment in a twisting or lateral direction of the first-surface mirror 77. This adjustment is provided for the purpose of securing the proper alignment of the mirror plane in manufacture or assemblage, and after such adjustment has once been made, it does not have to be made again.

Having thus described one illustrative embodiment of the invention, it is to be understood that although specific terms are employed, they are used in a generic and descriptive sense and not for purposes of limitation, the scope of the invention being set forth in the following claims.

I claim:

1. In combination, a camera casing having a range finder structure removably connected flatwise to a wall of the camera casing and a camera track mechanically connected to move coordinatingly with the movable part of the range finder, such combination including a range finder bed plate having mounted thereon all the parts of the range finder, and itself removably attached flatwise to a wall of the camera casing; said bed plate itself supporting with the several parts of the range finder all the adjusting means for said parts, thus permitting the removal of the entire range finder structure from the camera casing without disturbing any of the adjustments of said parts; said parts of the range finder structure carried by said bed plate including the following parts, viz: a mirror stationarily mounted on said bed plate at one end thereof; a second mirror at the other end of said plate; a supporting part directly receiving said second mirror, and movable to bring such second mirror into its functioning relation with said first mirror; adjusting means for mounting said movable supporting part on said bed plate with capacity for functioning adjustment relative to said first mirror; a shaft carried by said bed plate so as to be removable therewith and extending in the assembled combination through the said wall of the camera casing and mechanically connected to the said camera track; a movable member extending in a lengthwise direction between said mirrors, and carried by said bed plate, and engageable with said second mirror supporting part, and having an operative connection with said shaft; and means mounting said movable member directly upon the said bed plate for its functioning movements, all of said parts being removable with said bed plate from the camera casing without disturbing the relation or adjustments of any of said parts.

2. A combination according to claim 1, but in which the shaft of the bed plate is provided with a hub 87 adapted to be directly received in the wall of the camera casing, and through which hub the said shaft extends for its connection to the camera track.

3. A combination according to claim 1, but in which the said shaft has substantially radially extending therefrom a plate attached rigidly thereto, and with which plate the said movable member directly engages and is moved by said plate, for effecting the functioning operation of the range finder.

4. A combination according to claim 1, but in which the said shaft is provided with a cooperating spring for turning said shaft in one direction.

5. A combination according to claim 1, but in which the said shaft is provided with a part fast therewith and with which said movable member engages and is moved by said plate, for effecting the functioning operation of the range finder, and in which combination, an adjusting element is carried by the said bed and back plate and engages said part fast with the said shaft, for infinity adjustment.

6. A combination according to claim 1, but in which the said bed plate is of angular formation in cross section, to provide a bed portion thereof which is attached flatwise to the wall of the camera casing, and through which bed portion said shaft extends to a point within the camera casing and also to provide a back portion of said plate extending out at an angle to said camera casing wall for the attachment thereto of the remaining functioning movable parts of the range finder structure.

7. A combination according to claim 1, but in which the said supporting part for such second mirror is an elongated plate 78 directly and movably mounted for adjusting movement upon the said bed plate.

8. A combination according to claim 1, but in which said bed plate is of angular formation in cross section to provide the bed portion thereof which is attached flatwise to the wall of the camera casing, said bed portion carrying a bearing through which the shaft extends and to provide a back portion extending outward from the camera casing wall, and in which the said supporting part for such second mirror is received upon a stud directly carried by such back portion, screws 79, 80 being also directly carried by said back portion to adjust said supporting part for such second mirror a bracket being adjustably mounted on the back portion between the shaft and the movable mirror, which bracket supports the movable member.

9. A combination according to claim 1, but in which said movable member is directly carried by a supporting bracket itself adjustably attached to said bed plate, so as to be adjustable in a direction lengthwise of said movable member.

10. A combination according to claim 1, but in which said movable member is pivotally mounted for rocking movement upon the said bed plate imparted directly from said shaft, so that rocking movement imparted thereto from said shaft in the movement of the camera track effects corresponding movement of such second mirror.

11. A combination according to claim 1, but in which said movable member is pivotally mounted for rocking movement upon the said bed plate imparted directly from said shaft, so that rocking movement imparted thereto from said shaft in the movement of the camera track effects corresponding movement of such second mirror, and in which the said pivotal support for the movable member is so adjustably supported upon the said bed plate as to provide for the use of lenses of different focal length.

12. A combination according to claim 1, but in which the mechanical connection between the range finder structure and the camera track includes a lever arm 91 directly carried by the said shaft, and a member 87 slidingly movable along said camera track and operatively connected to said lever arm 91.

13. A combination according to claim 1, but in which the mechanical connection between the range finder structure and the camera track includes a lever arm 91 directly carried by said shaft, a member 87 slidingly movable along said camera track and operatively connected to said lever arm 91, and a second arm 88 also directly mounted upon the said shaft and having lost-motion connection with the said lever arm 91.

14. A combination according to claim 1, but in which the said bed plate is provided with means for effecting setting-adjustment of the said supporting part for the second mirror, in two different paths.

15. A combination according to claim 1, but in which the movable part for such second mirror is a plate rockably mounted on a stud 82 carried by the said bed plate and in which combination screws 79, 80 are carried by said bed plate and engage the said second mirror plate, to set said second mirror plate initially.

16. A combination according to claim 1, but in which said bed plate is of angular formation in cross section to provide the bed portion thereof which is attached flatwise to the wall of the camera casing, said bed portion carrying a bearing through which the shaft extends and to provide a back portion extending outward from the camera casing wall, and in which the said supporting part for such second mirror is received upon a stud directly carried by said back portion, screws 79, 80 being also directly carried by said back portion to adjust said supporting part for such second mirror, a bracket being adjustably mounted on the back portion between the shaft and the movable mirror, which bracket supports the movable member, and in which a spring 81 is provided tending to move in one direction the said supporting part for such second mirror.

17. A combination according to claim 1, but in which the said bed plate is of angular formation in cross section to provide a bed portion thereof which is attached flatwise to the camera casing and through which bed portion said shaft extends to a point within the camera casing, and also to provide a back portion of said plate extending out at an angle to said camera casing wall, said back portion having directly mounted thereon an infinity adjusting screw for controlling the movement of the said shaft, the movably mounted supporting plate for the second mirror and the lever extending in a lengthwise direction and engaging the said supporting plate for the second mirror and also engaging a part rigid with and moved by said shaft.

18. A combination according to claim 1, but in which said bed plate is of angular formation in cross section to provide a bed portion thereof which is attached flatwise to the camera casing and through which bed portion said shaft extends to a point within the camera casing, and also to provide a back portion of said plate extending out at an angle to said camera casing wall, said back portion having directly and pivotally mounted thereon the supporting plate for the second mirror and also a lever having one arm engaging said supporting plate for the second mirror and having the other arm directly engaging a part rigid with said shaft.

19. A combination according to claim 1, but in which the said bed plate is of angular formation in cross section to provide a bed portion thereof which is attached flatwise to the camera casing and through which bed portion said shaft extends to a point within the camera casing, and also to provide a back portion of said plate extending out at an angle to said camera casing wall, said back part having directly and adjustably mounted therein an infinity adjusting screw engageable by a part rigid with the said shaft.

OSCAR STEINER.